United States Patent [19]

Garrett et al.

[11] Patent Number: 4,898,267

[45] Date of Patent: Feb. 6, 1990

[54] ELECTROVISCOUS FLUID CLUTCH

[75] Inventors: Wayne H. Garrett, Troy; David A. Janson, Plymouth, both of Mich.

[73] Assignee: Eaton Corporation, Cleveland, Ohio

[21] Appl. No.: 343,963

[22] Filed: Apr. 27, 1989

[51] Int. Cl.⁴ .................... F16D 35/00; F16D 43/25
[52] U.S. Cl. ................... 192/21.5; 192/58 B; 192/82 T; 192/84 E
[58] Field of Search ............... 192/21.5, 58 B, 82 T, 192/84 E; 188/267

[56] References Cited

U.S. PATENT DOCUMENTS

| | | | |
|---|---|---|---|
| 2,818,148 | 12/1957 | Winther | 192/21.5 |
| 2,822,070 | 2/1958 | Jaeschke | 192/21.5 |
| 3,150,678 | 9/1964 | Nuber | 192/21.5 X |
| 3,972,399 | 8/1976 | Bopp | 192/58 |
| 4,046,239 | 9/1977 | Tinholt | 192/58 |
| 4,056,178 | 11/1977 | Detty | 192/58 |
| 4,181,205 | 1/1980 | Mennucci | 192/58 |
| 4,190,139 | 2/1980 | Tinholt | 192/58 |
| 4,246,995 | 1/1981 | Gee | 192/58 |
| 4,312,433 | 1/1982 | Bopp | 192/58 |
| 4,346,797 | 8/1982 | Bopp | 192/58 |
| 4,351,425 | 9/1982 | Bopp | 192/82 T X |
| 4,362,226 | 12/1982 | Gee | 192/58 |
| 4,591,037 | 5/1986 | Bopp | 192/58 |
| 4,727,969 | 3/1988 | Hayashi et al. | 192/58 B |
| 4,744,914 | 5/1988 | Filisko | 252/74 |
| 4,782,927 | 11/1988 | Sproston | 192/21.5 |

Primary Examiner—Rodney H. Bonck
Attorney, Agent, or Firm—J. G. Lewis

[57] ABSTRACT

An electroviscous fan clutch (10) is employed as an accessory drive mechanism within a truck or automobile. A shaft (36), either driven by the engine or driving a load (31), carries a clutch member (14) arranged for fluid engagement with a body member (12) for the transmission of torque therebetween when electroviscous fluid is disposed in an operating chamber (45) defined by complimentary shear surfaces (40 and 44) in the clutch and body members. The clutch and body members are electrodes, connected to a source of high voltage potential (86), which establish an electrostatic field within the operating chamber to selectively vary the characteristic viscosity of fluid flowing therethrough.

10 Claims, 1 Drawing Sheet

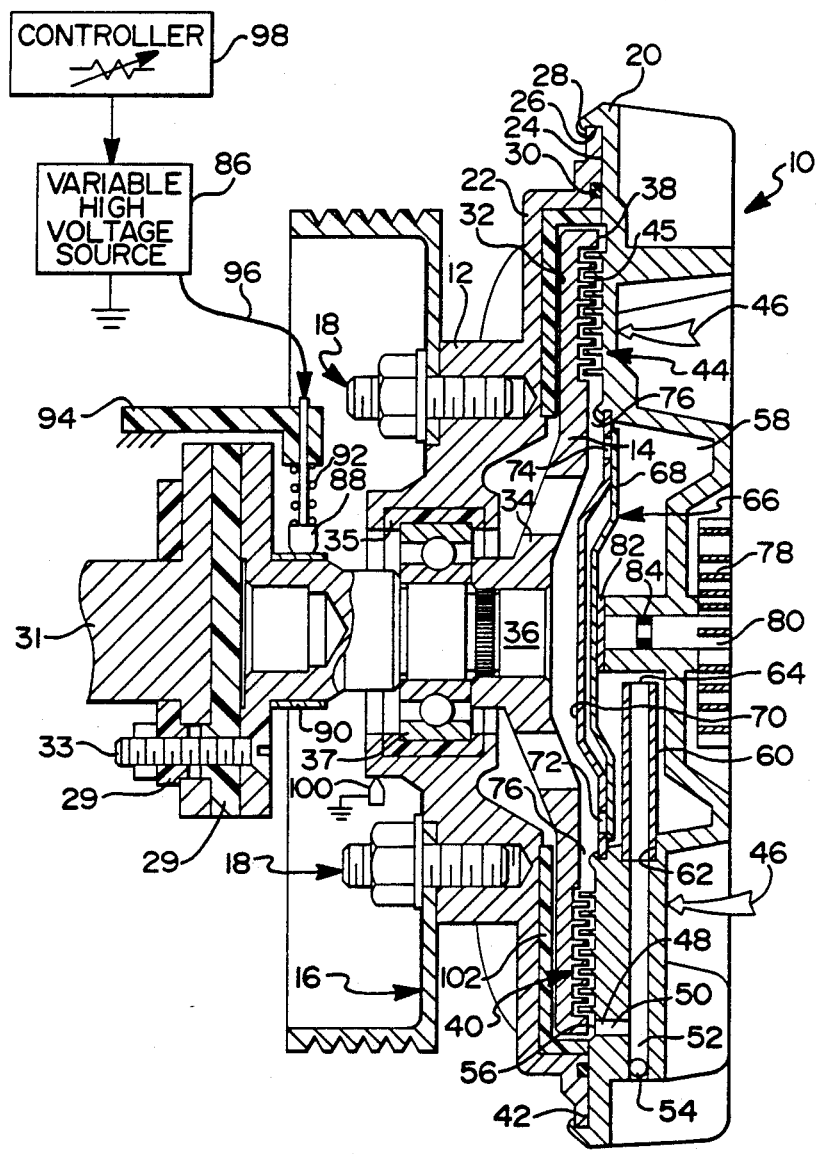

ELECTROVISCOUS FLUID CLUTCH

INTRODUCTION

The present invention relates to viscous fluid couplings, and more particularly to such couplings which employ electroviscous fluid to effect the transmission of torque between opposed coupling members.

CROSS REFERENCE

The subject matter o this application is related to that of an application filed on even date herewith entitled "Double Element Electroviscous Fluid Clutch" naming inventors Wayne H. Garrett and David A. Janson and identified as Ser. No. 343,962.

BACKGROUND OF THE INVENTION

It will be apparent from a reading of the specification that the present invention may be advantageously utilized with fluid couplings intended many different applications. However, the invention is especially useful when applied to a viscous fluid coupling or clutch which serves as a drive for an accessory of a vehicle engine, and will be described in connection therewith.

Viscous fluid couplings have received wide acceptance in the automobile industry, particularly for controlling the amount of torque transmitted to a vehicle radiator cooling fan. The most common form of such viscous fluid couplings is the air temperature response type such as illustrated in U.S. Pat. Nos. 3,055,473 to Oldberg et al and 3,809,197 to Clancey. In certain applications, however, it has become desirable to directly sense other system parameters, such as water temperature in the radiator, rather than the temperature of air passing through the radiator. To date, many arrangements have been proposed to accomplish this result. These arrangements, however, have made use of wet or dry plate clutches that are electrically actuated. In each of these arrangements, the advantages achieved through the use of viscous fluid have not been applied.

Another disadvantage common to viscous fluid couplings employing centrifugal pumps to circulate the fluid between a storage chamber and an operating chamber lies in the viscosity-temperature characteristic of typical silicon based viscous fluids. The viscosity of the fluid varies with ambient temperature and thus the transmission of torque between the shear surfaces can be controlled only by physical modulation of the circulating fluid flow between the operating and storage chambers. This flow is typically modulated by a valve element which selectively overlies a drain port interconnecting the storage and operating chambers. Although this approach has been acceptable for certain applications such as ON-OFF type fan drives, other applications demand more rapid or a tailored response of the clutch. Furthermore, the characteristically abrupt (dis)engagement of many known couplings renders them unsuitable for larger load applications.

More recently, so called electroviscous fluids have been developed for use in the fluid-actuated devices such as described in U.S. Pat. Nos. 4,782,927 and 4,744,914. Such fluids, when subjected to an electrostatic potential, become increasingly viscous or even solid. This effect, sometimes called the Winslow effect, is broadly described in Winslow's U.S. Pat. No. 2,417,850.

Electroviscous fluids exhibiting this property comprise a suspension of particles generally having a high dielectric constant in a fluid generally having a low dielectric constant. The particles are typically hydrophilic particles to which water is absorbed to impart a high dielectric property. In devices actuated with the use of an electroviscous fluid, the fluid is contained in a small gap between two electrically conductive members which serve as electrodes. When the device is a valve, the fluid can flow freely through this gap. When the device is a mechanical device, such as a clutch or brake, the two members can be moved freely relative to one another while maintaining the gap. When an electric potential is applied to the electrodes the fluid, in effect, solidifies thereby inhibiting fluid flow through a control orifice (in the case of the valve) or preventing relative movement between the electrodes (in the case of a brake or clutch).

The pressure which the device is capable of withstanding in the case of a valve or the force or torque which the device is capable of withstanding in the case of a clutch or brake is dependent upon the electrostatic potential applied between the electrodes. With an increasing electrostatic field, the shear force which the fluid is capable of withstanding is progressively increased until a point is reached when the fluid will no longer flow and effectively becomes solid. In the case of the valve, the reaching of this point means that the valve is fully closed, and in the case of a clutch or brake, the reaching of the solid state results in cessation of slipping.

A disadvantage of known electroviscous fluid-actuated devices employed as clutches or brakes, is that the fluid is permanently resident within the gap between the two torque transmitting members. Even with the fluid in its least viscous state, with no electrostatic field applied there across, the fluid continues to exhibit a finite degree of viscosity and thus continues to transmit a limited amount of torque across the members. In certain applications, it would be desirable to eliminate this efficiency robbing parasitic loss and resulting heat build-up and performance degradation. A further disadvantage of known electroviscous fluid actuated devices is in their relative large size and weight, shortcomings which are particularly disadvantageous for controlling vehicle accessories.

BRIEF DESCRIPTION OF THE INVENTION

The present invention finds particular application in a viscous clutch for driving an accessory such as a engine coolant fan or air conditioning compressor within an automobile or truck, the clutch including first and second members mounted for relative rotation about a common axis and defining cooperating shear surfaces forming an operating chamber therebetween and means for circulating electroviscous fluid between the operating chamber and a storage chamber. Means are provided to modulate the circulating flow and thereby control the fill or quantity of electroviscous fluid within the operating chamber as a function of a sensed parametric input such as an engine coolant temperature switch or host vehicle logic circuit. A source of high voltage potential is applied across two or more electrodes which are positioned to establish an electrostatic field within the operating chamber to selectively vary the characteristic viscosity of fluid flowing therethrough. This arrangement effectively permits purging of substantially all fluid from the operating chamber in certain clutch operating modes, virtually eliminating parasitic losses and heat related performance degradation.

The preferred embodiment of the invention comprises an electrically conductive clutch member secured for rotation with a shaft, and an electrically conductive cover member rotatably disposed on the shaft relative to the first member and electrically insulated therefrom. Shear surfaces disposed on the clutch and cover members form an operating chamber therebetween. A reservoir cover is affixed to the cover member adjacent the clutch member to define an annular fluid storage chamber in combination with the cover member with the fluid storage chamber disposed coaxially with the shaft. At least one pump is provided defined by adjacent portions of the clutch member and cover member radially opposite the shaft which operates to displace electroviscous fluid from the operating chamber radially inwardly to a point within the fluid storage chamber substantially adjacent the axis of the shaft. Valve means is provided to selectively interconnect the fluid storage chamber and the operating chamber whereby in a first position a valve element prevents electroviscous fluid in the fluid storage chamber from flowing into the operating chamber and in a second position the valve element establishes fluid communication between the radially outward most portion of he fluid storage chamber and the operating chamber, the electroviscous fluid flowing therebetween under the influence of centrifugal forces acting upon the fluid within the fluid storage chamber during periods of relatively high speed operation of the body member. Finally, a source of variable high voltage potential in circuit with the clutch and cover members is provided whereby the clutch and cover members function as spaced electrodes when a voltage potential is applied there across to establish a variable electrostatic field within the operating chamber to effect a localized change in the characteristic viscosity of fluid within the operating chamber. This arrangement has the advantage of permitting total disengagement of the clutch wherein all of the electroviscous fluid is pumped out of the operating chamber into the storage chamber whereby static and dynamic bleed back from the storage chamber to the operating chamber is prevented. Furthermore, this arrangement has the advantage of providing mechanical flow control of circulating electroviscous fluid within the clutch.

Various other features and advantages of this invention will become apparent upon reading the following specification, which, along with the patent drawings, describes and discloses a preferred illustrative embodiment of the invention as well as two alternative embodiments of the invention in detail.

The invention makes reference to the accompanying drawing.

BRIEF DESCRIPTION OF THE DRAWING

The drawing figure is a side elevational view, taken mostly along the center line of a viscous fluid coupling assembly according to the preferred embodiment of the invention.

DETAILED DESCRIPTION OF THE SPECIFIC EMBODIMENT

Referring to the drawing figure, the present invention provides an improved viscous fluid clutch 10. The viscous fluid clutch 10 includes a body member 12 and a clutch member 14. Body member 12 has a belt pulley 16 secured thereto by means of fastener assemblies 18. Pulley 16 is intended to be driven by the host vehicle engine through a segmented endless drive belt (not illustrated) as is well known in the art.

Body member 12 is made in two-parts which, for the purposes of this application, are termed a forward coupling member 20 and a rear coupling member 22. Forward coupling member 20 is formed with a pilot portion having a surface 24 which extends peripherally therearound and which guides the outer portion 26 of rear coupling member 22 into assembled position therewith. When coupling members 20 and 22 are guided together into the position illustrated, a portion 28 of forward coupling member is bent over to secure and seal the forward and rear coupling members 20 and 22 respectively. A suitable gasket type O-ring seal 30 is provided between coupling members 20 and 22 in order to prevent leakage of electroviscous shear fluid therebetween.

Body member 12, constructed of the assembled forward and rear coupling member 20 and 22, defines a chamber generally designated 32 in which clutch member 14 rotates. Clutch member 14 is a disk shaped member which has an integral hub portion 34. Hub portion 34 is suitably fixedly secured for rotation with a shaft 36 which, in application, is coupled to a rotary member 31 of a load controlled by clutch 10 by suitable fasteners 33 and electrically insulating spacers 29. Body member 12 is mounted for rotation about shaft 36 upon an intermediate bearing 37 and electrically insulating spacer 35. Thus, clutch 10 is carried by rotary member 31 but is electrically isolated therefrom. Furthermore, body member 12 is carried for rotation about shaft 36 but is electrically isolated from clutch member 14.

Body member 12 and clutch member 14 have cooperating shear surfaces thereon which are spaced very close to each other whereby an electroviscous shear medium in the space between the surfaces transmits torque therebetween so that clutch member 14 rotates due to the torque transmission through the electroviscous shear fluid.

In the embodiment illustrated in the drawing FIGURE, the torque transmitting surfaces on members 12 and 14 are in the form of a plurality of lands and grooves. More specifically, a series of lands and grooves are formed on the forward face 38 of clutch member 14 and are generally designated 40. Cooperating lands and grooves are formed on the face 42 of forward coupling member 20 and are generally designated 44. Lands and grooves 44 on forward coupling member 20 cooperate with lands and grooves 40 on clutch member 14 and are, in effect, interdigitated as shown when assembled. The lands and grooves are very closely spaced and provide a substantial area for the transmission of torque between body and clutch members 12 and 14 in view of their relatively large number. In fact, there are nine projecting lands on body member 12 which project into nine grooves on clutch member 14 and eight lands on clutch member 14 projecting into eight grooves on body member 12. The annular volume between lands and grooves 40 and 44 is designated as an operating chamber 45.

Cooperating lands and grooves 40 and 44 are located in a direct line with the ram air which impinges against the outer face of forward coupling member 20. As a result, lands and grooves 40 and 44, which effect the torque transmission, are located as closely as possible to the ram air as indicated by arrows 46. There is a substantial amount of heat dissipation due to such location of lands and grooves 40 and 44. This is a substantial improvement over designs having lands and grooves on the rear face of an input coupling member and cooperating lands and grooves on a mating rear part out of the ram air stream. It should be apparent that there is a substantial number of cooperating lands and grooves and these provide substantial torque transmitting surface area so that the viscous coupling has a substantial torque transmitting capability. This enables the viscous coupling to be readily used for driving relatively large vehicle born loads such as engine cooling fans, air conditioning compressors, auxiliary power units and the like.

As is known, the amount of torque transmitted between lands and grooves 40 and 44 to the load is a function of the amount of fluid in the viscous shear space or operating chamber 45 therebetween. The viscous coupling of the present invention is provided with a construction where the amount of electroviscous shear fluid in that space can be varied, due to requirements of the load. This is affected generally by the use of a mechanism for pumping electroviscous fluid from operating chamber 45 and a temperature sensing valve mechanism for controlling the flow of fluid back into the operating chamber 45.

The electroviscous shear fluid may be pumped from the operating chamber 45 by the action of a pair of pumping surfaces which are formed on face 42 of forward coupling member 20. This pumping arrangement is well known in the art and is described in detail in U.S. Pat. No. 3,809,197, the specification of which is incorporated herein by reference. The pumping surfaces are located in the path of flow of fluid as it is dragged around forward coupling member 20 by rotation of clutch member 14. The impingement against these surfaces creates a pressure adjacent pump exit ports 48 in body member 12. Pump exit ports 48 communicate with respective axially extending passages, one of which is shown and designated 50. Passage 50 communicates with a radially extending passageway 52 in forward coupling member 20. Passageway 52 is sealed at its radial outer end by a suitable means such as a plug or a pressed-in ball, designated 54. A similar radial flow passageway (not shown) cooperates with the other pump exit port (not illustrated).

Pump exit ports 48 are formed at one end of arcuate channels 56 in face 42 of forward coupling member 20. Each arcuate channel 56 extends slightly less than 180 degrees around output member 12, the viscous fluid being moved therein due to the movement or rotation of clutch member 14 with respect to body member 12. When the fluid impinges against surfaces described herein above it flows through passage 50 associated with pump exit ports 48 and into a central fluid storage chamber 58 after passing radially inwardly through passage 50, passageway 52, and a passage extending standpipe 60. The radially inward most end of passageway 52 has an area of increased diameter 62 within which the radially outward most end of standpipe 60 is pressed fit for retention thereby. Standpipe 60 depends radially inwardly from area of increased diameter 62 and terminates in a discharge opening 64 at a point within fluid storage chamber 58 adjacent or relatively near the central axis of shaft 36. Fluid storage chamber 58 comprises an annular chamber which encircles the axis of rotation of members 12 and 14 and provides for the storage of electroviscous shear fluid therein. The volume of fluid storage chamber 58 is such that substantially all of the electroviscous shear fluid in the coupling 10 may be stored therein, the surface of the stored fluid being at all times radially outward from discharge opening 64. Thus, even in the condition when all of the viscous fluid within clutch 10 is stored within fluid storage chamber 58, the fluid cannot migrate or drain back through passages 50 and 52. This is true both in static and in dynamic conditions for when member 12 is not rotating, all viscous fluid stored in the fluid storage chamber 58 will come to rest in the lower most portion of fluid storage chamber 58, its surface being below discharge opening 64. When member 12 is rotating, viscous fluid stored within fluid storage chamber 58 is forced towards the radially outward most wall of fluid storage chamber 58 and, again, the surface thereof is radially outward from discharge opening 64. Additionally, in the position illustrated, the standpipe which is not illustrated will be projecting radially downwardly into fluid storage chamber 58 and will also be unavailable as a drain passage for viscous fluid to return to passages 50 and 52. It is contemplated that the actual radial displacement of discharge opening 64 from the axis of rotation of shaft 36 can vary depending upon the electroviscous fluid storage capacity of that portion of fluid storage chamber 58 located radially outwardly of discharge opening 64. What is important is that, under all conditions, the level of the viscous fluid within fluid storage chamber 58 be radially outward from discharge opening 64.

The electroviscous shear fluid, as noted herein above, flows into the shear space defined by lands and grooves 40 and 44 under the control of a temperature responsive valve mechanism generally designated 66. Valve mechanism 66 specifically controls the flow of electroviscous fluid from fluid storage chamber 58 into operating chamber 45. Valve mechanism 66 includes a valve member 68 which cooperates with a plate 70 which defines one side of fluid storage 58. Plate 70 is suitable secured to forward coupling member 20 around the periphery of plate 70 and thereby defines the rear side of fluid storage chamber 58. Plate 70 has a pair of holes 72 and 74 therein and valve member 68 extends radially relative to plate 70 and is positionable to selectively overlay holes 72 and 74. If valve member 68 closes holes 72 and 74, the electroviscous fluid may not flow from storage chamber 58 outwardly thereof through holes 72 and 74. When valve member 68 is moved so that holes 72 and 74 are opened, fluid flows from fluid storage chamber 58 through those holes and into an area designated 76 and from that area the fluid is thrown by centrifical force outwardly into operating chamber 45 between lands and grooves 40 and 44.

Valve member 68 is moved relative to plate 70 and relative to holes 70 and 72 therein by temperature sensing bimetallic spring element 78 which is suitably mounted in the conventional manner on forward coupling member 20 and which is connected to a shaft 80. Shaft 80 on its inner end is suitably connected to valve member 68 through an intermediate washer 82 such as by spot welding or the like and O-ring 84 which resides in an area of reduced diameter in shaft 80 substantially intermediate washer 82 and spring element 78 serves to form a seal between shaft 80 and forward coupling member 20. Temperature sensing by metallic spring element 78 is of the type which, when it senses a change in the ambient temperature surrounding it, it effects the rotation of shaft member 80. Shaft member 80, in turn, effects a movement of valve member 68 relative to plate 70. The specific temperature responsive valve device is similar to the valve device disclosed in U.S. Pat. No. 3,263,783 and reference may be made thereto for further details of construction and operation. Furthermore, spring element 78 could be replaced by a rotary solenoid tethered to a ground portion of a host vehicle, or other suitable actuator device operative to selectively position valve member 68 in response to a parametric input signal to effect ON-OFF operation or controlled (dis)engagement of clutch 10.

If it is desired to reduce the amount of fluid in the shear surface between lands and grooves 40 and 44, it is necessary only to effect the movement of valve member 68 into a position blocking the flow of fluid from fluid storage chamber 58 into area 76. This occurs when temperature sensing bimetal element 78 senses a low temperature and therefore a reduction in the required speed of the driven load (fan). Holes 72 and 74 will be closed or their open area reduced, minimizing flow into operating chamber 45. As a result, the rotation of member 14 will cause fluid to be dragged or moved relative to the surfaces within channels 56 and the fluid will then flow through pump exit ports 48 and into fluid storage chamber 58 through discharge opening 64 of standpipe 60. As a result, there will be a net reduction of electroviscous fluid in the operating chamber 45 and therefore a reduction in the torque transmitted to the load. In the event that it is desired to increase the torque transmitted to the load, it is necessary then to increase the amount of fluid in operating chamber 45. As a result, holes 72 and 74 must pass a greater amount of fluid into the operating chamber 45 than that which is being past from the operating chamber 45 due to the action of the pumping surfaces therefore, holes 72 and 74 must be opened by valve member 68 in order to enable a sufficient flow of electroviscous fluid into operating chamber 45 to occur so that there is a net gain in the fluid within operating chamber 45.

When viscous fluid clutch 10 is at rest, all of the electroviscous shear fluid takes a position in the lower part thereof. Upon rotation, the electroviscous shear fluid is dragged around the periphery of clutch 10 by its rotation and due to centrifical force, the viscous shear fluid flows outwardly into operating chamber 45. Once located in operating chamber 45, the electroviscous shear fluid due to pumping action of the pumping surfaces, flows into fluid storage chamber 58 and the flow of fluid from the fluid storage chamber 58 is under the control of valve member 68. As member 14 rotates relative to member 12, viscous shear fluid in the operating chamber 45 transmits torque between the members to effect a transmission of torque to the load. As this rotation occurs, periodic alignment occurs between radially disposed channels in members 14 and 12 as is described in detail in U.S. Pat. 3,809,197. As this occurs, the periodic alignment between those channels defines a relatively large passageway for radially outward flow of fluid from fluid storage chamber 58, thereby filling operating chamber 45 at the outer periphery thereof. These channels provide for flow radially outwardly at all times not only when aligned, and provide for rapid response due to flow from fluid storage chamber 58 and also during an initial start-up.

In addition to mechanical modulation of the circulating flow of electroviscous shear fluid by valve mechanism 66 described herein above, separate and independent control of the fluid flow is effected by exposing a portion of the fluid to an intense electric field to effect a localized change in its viscosity and thus flow rate. This control is essentially independent of the relative and absolute rates of rotation of body member 12 and clutch member 14.

As described herein above, shaft 36 is carried by but electrically insulated from rotary member 31. Shaft 36 and clutch member 14 are constructed of electrically conductive material and are electrically in circuit with a high voltage source 86 through a brush 88 and slip ring 90 arrangement. Brush 88 is pressed into intimate contact with slip ring 90 by a biasing spring 92 compressively loading brush 88 against a grounded insulating support member 94. Thus, voltage source 86 outputs a high voltage potential to clutch member 14 via a conductor 96, brush 88, slip ring 90 and shaft 36. The potential of the voltage applied on conductor 96 is varied by a controller 98.

Forward and rear coupling members 20,22 of body member 12 are also constructed of electrically conductive material. As described herein above, body member 12 is carried for rotation upon shaft 36 but electrically insulated therefrom by spacer 35. Body member 12 is in circuit with high voltage source 86 via a brush/slip ring 100 through ground. Thus, body member 12 is maintained at ground potential at all times independent of its rotary position and speed. An electrically insulating annular spacer 102 is disposed within chamber 32 intermediate the left-hand most surface of clutch member 14 and rear coupling member 22. Annular spacer 102 is carried by rear coupling member 22 in closely spaced non-contacting relationship with clutch member 14, assuring that a minimum axial and radial spacing between clutch member 14 and rear coupling member 22 is maintain at all times. Body member 12 and clutch member 14 are configured so that their points of closest approach or spacing is provided by lands and grooves 40 and 44. Thus, when a voltage potential is applied to conductor 96, a large electric field will be produced in the area between adjacent respective lands and grooves 40 and 44 of body and clutch members 12 and 14 which constitutes the operating chamber 45 of clutch 10. In application, when valve member 68 is positioned to provide a flow of electroviscous fluid through operating chamber 45, the viscosity of fluid therein can be materially effected by the imposition of a high voltage on conductor 96 and thus the torque carrying capacity of clutch 10 controlled virtually instantaneously without requiring repositioning of valve member 68. Thus, in the preferred application, valve mechanism 66 can be employed for simple binary or ON-OFF operation while the high torque spikes encountered upon engagement and disengagement of clutch 10 under high load conditions can be absorbed by active control of high voltage source 86 by controller 98.

It is to be understood that the invention has been described with reference to a specific embodiment which provides the features and advantages previously described, and that such specific embodiment is susceptible of modification, as will be apparent to those skilled in the art. Accordingly, the foregoing is not to be construed in a limiting sense.

What is claimed is:

1. An electroviscous fluid clutch comprising:
   first and second members mounted for relative rotation about a common axis and defining cooperating shear surfaces forming an operating chamber therebetween;

means operative to circulate electroviscous fluid between said operating chamber and a storage chamber;

means operative to modulate said circulating flow as a function of a sensed parametric input;

a source of high voltage potential; and a plurality of electrodes in circuit with said source positioned to establish an electrostatic field within said operating chamber to selectively vary the characteristic viscosity of fluid flowing therethrough.

2. The electroviscous fluid clutch of claim 1, wherein said sensed parametric input comprises a host system temperature.

3. The electroviscous fluid clutch of claim 1, further comprising means operative to vary said voltage potential as a function of a second sensed parametric input.

4. The electroviscous fluid clutch of claim 1, wherein said fluid circulation means operates during relative rotation between said members.

5. An electroviscous fluid clutch comprising:

first and second members mounted for relative rotation about a common axis and defining cooperating shear surfaces forming an operating chamber therebetween;

a return passageway operative to direct electroviscous fluid from said operating chamber to a storage chamber as a function of relative rotation between said members;

valve means operative to effect modulation of electroviscous fluid flowing from said storage chamber to said operating chamber as a function of a sensed parametric input;

a source of high voltage potential; and first and second electrodes in circuit with said source positioned to establish a variable electrostatic fluid within said operating chamber to effect a change in the characteristic viscosity of fluid within said operating chamber.

6. An electroviscous fluid clutch comprising:

a first member secured for rotation with a shaft;

a second member rotatably disposed on said shaft relative to said first member;

shear surfaces disposed on said first and second members and forming an operating chamber therebetween;

a fluid storage chamber disposed adjacent said operating chamber;

pump means operative to displace electroviscous fluid from said operating chamber and discharge said fluid within said fluid storage chamber as a function of relative rotation between said first and second members;

valve means effecting selective communication between said storage chamber and said operating chamber and including a valve member movable in response to a sensed parametric input between first and second positions, one of said positions providing fluid communication between said storage chamber and said operating chamber and the other of said positions blocking such communication;

a source of high voltage potential; and first and second electrodes carried with said first and second members, respectively, in circuit with said source and positioned to establish a variable electrostatic field within said operating chamber to effect a change in the characteristic viscosity of fluid within said operating chamber.

7. The electroviscous fluid clutch of claim 6, further comprising means operative to control said source of high voltage potential as a function of a second sensed parametric input.

8. An electroviscous fluid clutch comprising:

an electrically conductive clutch member secured for rotation with a shaft;

an electrically conductive cover member rotatably disposed on said shaft relative to said first member and electrically insulated therefrom;

shear surfaces disposed on said clutch and cover members and forming an operating chamber therebetween;

a reservoir cover affixed to said cover member adjacent said clutch member and defining an annular fluid storage chamber in combination with said cover member, said fluid storage chamber being disposed coaxially with said shaft;

at least one pump defined by adjacent portions of said clutch member and cover member radially distal said shaft and operative to displace electroviscous fluid from said operating chamber radially inwardly within to a point within said fluid storage chamber substantially adjacent the axis of said shaft and which is spaced above the uppermost surface level assumed by the electroviscous fluid within the storage chamber when substantially all of said fluid is disposed therein during periods of relatively low torque transmission through said clutch;

valve means operative to selectively interconnect said fluid storage chamber and operating chamber whereby in a first position said valve means prevents electroviscous fluid in said fluid storage chamber from flowing into said operating chamber and in a second position said valve means establishes fluid communication between the radially outward most portion of said fluid storage chamber and said operating chamber, the electroviscous fluid flowing therebetween under the influence of centrifugal forces acting upon electroviscous fluid within said fluid storage chamber during periods of relatively high torque transmission through said clutch; and a source of variable high voltage potential in circuit with said clutch and cover members whereby said clutch and cover members function as spaced electrodes when a voltage potential is applied there across to establish a variable electrostatic field within said operating chamber to effect a change in the characteristic viscosity of fluid within said operating chambers.

9. The electroviscous fluid clutch of claim 8, wherein said sources of high voltage potential is relatively stationary with respect to said clutch and cover members and is electrically interconnected therewith through intermediate slip interfaces.

10. The electroviscous fluid clutch of claim 8, wherein a substantially radially oriented standpipe interconnects the outlet of each pump and discharges fluid into said fluid storage chamber at said point substantially adjacent said axis.

* * * * *